July 26, 1927.
K. TRAMP
1,637,205
FLUID HEATING FAUCET
Filed June 2, 1926
2 Sheets-Sheet 1
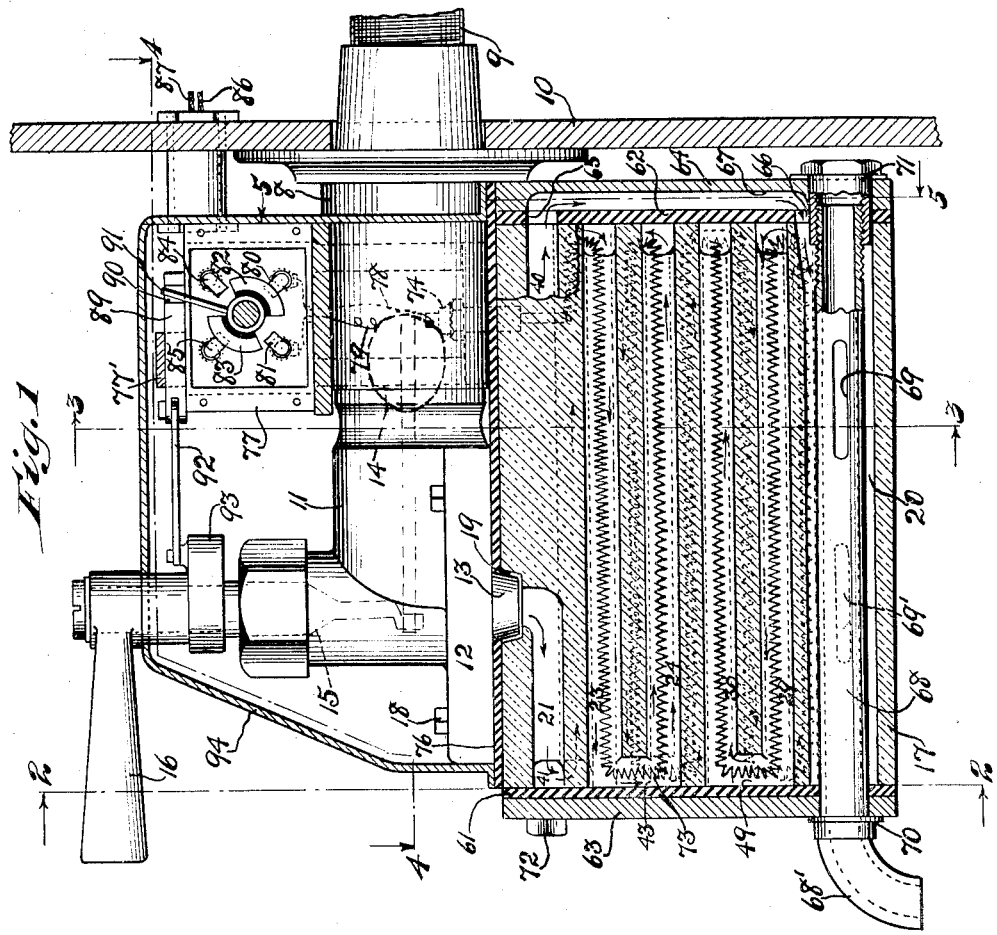
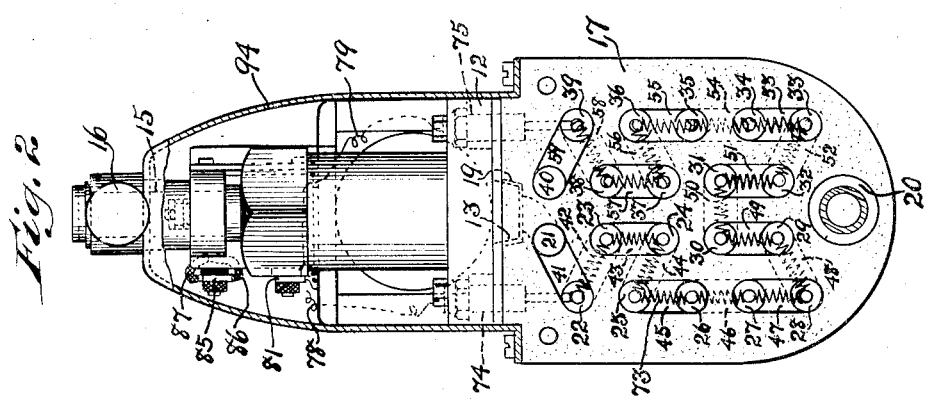
Inventor:
Karl Tramp,
By J. Daniel Stuwe
Attorney.

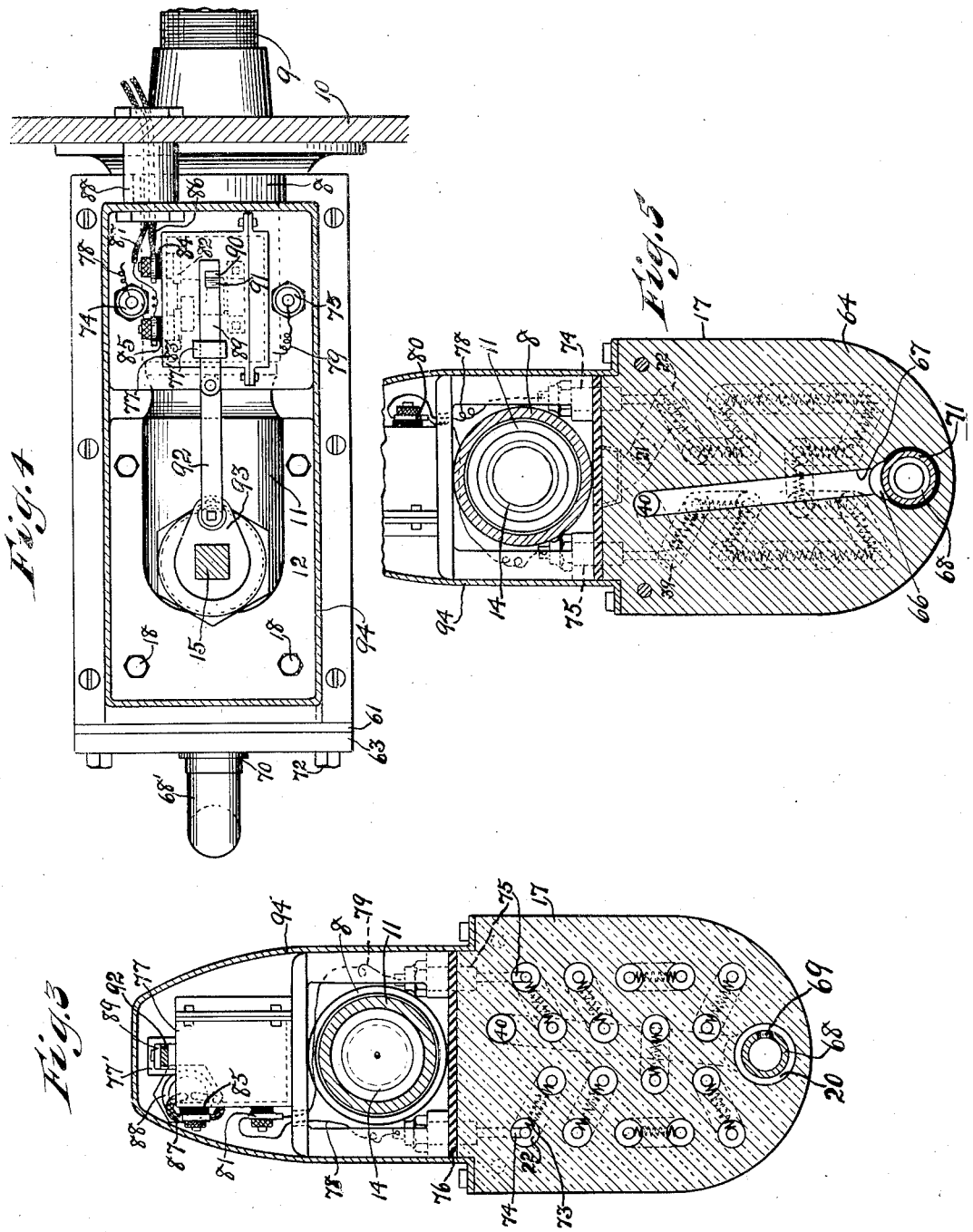

Patented July 26, 1927.

1,637,205

UNITED STATES PATENT OFFICE.

KARL TRAMP, OF CHICAGO, ILLINOIS.

FLUID-HEATING FAUCET.

Application filed June 2, 1926. Serial No. 113,161.

My invention relates to a new and useful fluid heating faucet, and the invention has for an object to provide a faucet device with means thereon for heating fluid and for delivering it heated from the faucet device. Another object is to provide a faucet with heating mechanism having a channel with means for heating the fluid from the faucet as it goes through said channel. And another object is to provide a faucet combined with heating mechanism which includes electric means with a switch for heating fluid issuing from said faucet, and to have said switch connected with the valve of the faucet so as to operate said switch and the heating means thereby automatically and simultaneously with the turning of said valve.

Other objects and advantageous ends are accomplished with my invention as will become apparent from the following description taken in connection with the accompanying drawings in which:

Fig. 1 is a vertical central section taken longitudinally through one form of construction embodying my invention;

Figs. 2, 3 and 5 are vertical cross sections taken on lines 2—2, 3—3 and 5—5 of Fig. 1; and Fig. 4 is a horizontal section taken on line 4—4 of Fig. 1.

In the drawings I have illustrated a certain form of construction embodying my invention, and have shown the same adapted for use on a kitchen sink or the like. This form comprises a faucet having its rear half or rear portion 8 made of standard construction, said portion being threaded on the wall pipe 9 and located in the vertical sink plate or supporting member 10. The front part 11 of the faucet is threaded in the rear part 8, and is made of special construction, having supporting flanges 12 on its sides, an outlet spout 13 at the bottom, and a valve which includes a valve ball 14, a stem 15 and a handle 16 for operating and controlling the valve.

I provide a heating mechanism and combine it with this special construction of the faucet, and this mechanism comprises a body 17 arranged to be mounted on the side flanges 12, preferably by means of bolts 18 extending through said flanges and into holes in the body 17. An opening 19 in said body receives spout 13, and a continuous channel extends from said spout and opening to and fro through the body. This continuous channel is preferably formed by making a plurality of bores longitudinally through the body and connecting them by grooves at the opposite ends. This may be done by making a large outlet bore 20 at the lower part of the body and making bores 21 to 40 inclusive in succession, as shown in the drawing, and then connecting these bores by grooves 41 to 59 inclusive, as shown, while pliable end members or gaskets 61 and 62 of rubber or the like are placed over the ends and grooves, and outer covering plates 63 and 64 of metal or other rigid material are placed over said gaskets, thus providing a continuous channel beginning at the top of said body with channel 21 and ending at the top of the body also with channel 40. Holes 65 and 66 are placed near the top and the bottom of gasket 62, and a trough or channel 67 is formed on plate 64 connecting said holes 65 and 66, thus forming a downward passage which connects the main part of the continuous channel with the outlet bore 20.

A special tubular discharge member 68 with a suitable discharge spout 68' is mounted in bore 20, and has side slots 69 and 69' for taking in fluid from said bore 20 which has a greater cross section than said member 68. This member has means at its ends, preferably a flange or collar 70 at one end and threads with a closed nut 71 at the other end, for engaging plates 63 and 64 and drawing and holding the structure tightly together. Said tubular member 68 thus serving as a discharge pipe or member and also as a fastening bolt for fastening the plates and gaskets on the body. Bolts or screws 72 may also be used to additionally fasten said plates and gaskets on said body.

The means for heating the fluid preferably includes an electric coil 73 mounted in the continuous channel, preferably beginning with bore 22 and ending in bore 39, as best shown in Figs. 2 and 3. Binding posts 74 and 75 extend from the wire coils above said body and over an insulating gasket 76 which is mounted on the body. This coil is of a construction especially adapted for extending through water and similar fluids and for heating said water or fluid to a very high degree, and as it extends nearly the entire length of the channel it exerts a very intense and efficient heating effect on the water in said channel as it passes there-through.

A suitable quick acting switch is provided to operate the electric heating coils, and this switch is connected to binding posts 74 and 75 by conductors 78 and 79 which lead from said posts to the switch contact members 80 and 81, which are engageable respectively by arms or blades 82 and 83 of the movable switch member, said blades connecting contact members 80 and 81 with co-operating contact members 84 and 85 connected with the electric power line by the use of conductors 86 and 87, which may extend through a suitable sleeve 88 and the sink plate 10, or may be arranged and hidden in any suitable manner.

Means is provided for continuously and automatically operating the switch with the turning and operation of the valve, and this means preferably includes a bar 89 of insulating material mounted on switch 77 and being movable through a guide strap 77' on the switch, and having near one end a notch 90 through which extends the operating arm 91 of the switch. The other end of said bar is pivoted to a link 92 which is pivoted to a crank member 93 mounted on and turning with valve stem 15. A suitable housing 94 is mounted on the body 17 to cover the faucet, the switch and the conductors as shown.

The switch arm 91 is provided with a small amount of loose play in the notch 90, and the entire construction is arranged so that the valve handle 16 and the valve are turned a slight degree, so that the water or fluid is turned on and commences to flow a moment before the switch is thrown on and before the blade 82 engages contact 84, and blade 83 engages contact 81, that is before the contact points 80 and 81 are connected with the contact points 84 and 85, thus assuring the flow of water before the electric current is turned on and before the heating coils become operative; and it is further apparent that the channel and the heating means is arranged so that water stands continuously over the heating coils and in the body of the heating mechanism, thus preventing any over-heating of the material of the body, which is preferably provided from a refractory or earthen material with the channels arranged non-porous; and the entire construction is so arranged that the water will flow from the device as it is heated, thus preventing any over-heating of the water or fluid or any production of steam or excessive or dangerous pressure. It is also apparent that by turning the valve open to a small degree, the fluid will pass slowly over the electric heating means, and will thereby be heated to a high degree, and by turning the valve open to a farther extent, more of the fluid will pass over the heating coils, and will thus be heated to a smaller degree; in other words the heating effect of the coils and device upon the fluid passing there-through, may be readily controlled by turning and regulating the valve by means of handle 16, thus having the water heated to a moderate degree or to a very high degree, as the water is delivered from spout 68' on the tubular member 68; and it is evident that the valve and the switch are arranged and connected so that the heating means is operated and controlled automatically and simultaneously with the turning and operating of the valve.

What I claim as my invention and desire to secure by Letters Patent is:

1. A fluid heating faucet comprising faucet mechanism including a standard tubular rear portion having a valve ball therein, a front portion detachably mounted on said rear portion and having fluid outlet means and handle means for sliding said ball longitudinally in said tubular rear portion, and heating mechanism mounted on said front portion and having a channel for conducting fluid from said outlet means to and fro through said heating mechanism.

2. A fluid heating faucet comprising faucet mechanism including a standard tubular rear portion having a valve ball slidable longitudinally therein, a tubular front portion detachably threaded on said rear portion and having lower flanges and outlet means also an upwardly extending part provided with a stem and a handle thereon, means connecting said stem with said ball for sliding the same by turning said handle, and heating mechanism mounted on said lower flanges and having a channel for conducting fluid therethrough from said outlet means.

3. A fluid heating faucet comprising tubular faucet means including a standard rear portion and a front portion detachably mounted thereon and having an outlet spout, a valve element longitudinally movably in said tubular faucet means, a handle on said front portion for moving said valve element, and heating mechanism mounted on said detachable front portion and having a channel connected to said spout for conducting and heating fluid flowing therefrom.

4. A fluid heating faucet comprising tubular faucet means having a standard valve ball and attached means movable longitudinally of said tubular means, an outlet spout adjacent the front of the tubular means, a standard handle for moving said valve ball and attached means, and heating mechanism detachably mounted beneath said tubular means and having a channel abutting said spout for conducting and heating fluid flowing therefrom.

5. A fluid heating faucet comprising tubular faucet means having an outlet spout at the front and a standard valve ball mounted for movement longitudinally of said tubular means and for ready removal therefrom, heating mechanism mounted on said tubular means and having a channel with electric heating means therein for conveying and heating fluid from said spout, a switch for the heating means, and a standard handle with a stem and connecting means for operating said switch and valve to regulate the degree of heat by controlling the flow of fluid.

In testimony whereof I have signed my name to this specification.

KARL TRAMP.